United States Patent [19]

McCallister

[11] Patent Number: 4,630,958
[45] Date of Patent: Dec. 23, 1986

[54] ATTACHING COAXIALLY A MEMBER OR FITTING WITH A BORE THERETHROUGH TO A SHAFT

[75] Inventor: John S. McCallister, Christchurch, New Zealand

[73] Assignee: Sim-Tech Limited, Christchurch, New Zealand

[21] Appl. No.: 536,659

[22] Filed: Sep. 29, 1983

[30] Foreign Application Priority Data

Oct. 4, 1982 [NZ] New Zealand .................. 202076

[51] Int. Cl.$^4$ .................. F16B 21/16; F16B 21/18
[52] U.S. Cl. ........................ 403/257; 403/326; 403/317; 403/377; 403/405.1; 403/DIG. 7; 92/128; 92/257; 92/258
[58] Field of Search ............ 403/261, 317, 257, 405.1, 403/377, 408.1, DIG. 7, DIG. 6, 204, 287, 326, 360, 261; 92/255-259, 29, 30, 128

[56] References Cited

U.S. PATENT DOCUMENTS

| | | |
|---|---|---|
| 1,650,573 | 11/1927 | Searles .................. 403/261 |
| 2,847,238 | 8/1958 | Bolling .................. 403/408.1 |
| 2,853,347 | 9/1958 | Cooper, Jr. . |
| 3,312,150 | 4/1967 | Strader . |
| 3,413,022 | 11/1968 | Waddel .................. 403/261 |
| 3,426,657 | 2/1969 | Bimba .................. 403/204 X |
| 3,457,842 | 7/1969 | Tennis . |
| 3,807,285 | 4/1974 | Phillips .................. 92/255 |
| 3,951,048 | 4/1976 | Bloom, Jr. et al. .................. 403/261 |
| 4,069,747 | 1/1978 | Forry et al. .................. 92/255 X |
| 4,171,665 | 10/1979 | Stoll .................. 92/257 X |
| 4,182,578 | 1/1980 | Livesay et al. .................. 403/360 |
| 4,261,668 | 4/1981 | Rigal .................. 403/326 X |
| 4,317,409 | 3/1982 | Bottoms .................. 92/258 X |
| 4,405,251 | 9/1983 | Kolchinsky et al. .................. 403/377 X |

FOREIGN PATENT DOCUMENTS

| | | |
|---|---|---|
| 1500860 | 6/1969 | Fed. Rep. of Germany ...... 403/377 |
| 2450767 | 4/1976 | Fed. Rep. of Germany ... 403/DIG. 6 |
| 543733 | 4/1942 | United Kingdom . |
| 770659 | 3/1957 | United Kingdom ......... 403/DIG. 6 |
| 821737 | 10/1959 | United Kingdom . |
| 1117777 | 6/1968 | United Kingdom . |
| 1121635 | 7/1968 | United Kingdom . |
| 1259333 | 1/1972 | United Kingdom . |
| 496383 | 3/1976 | U.S.S.R. .................. 403/DIG. 7 |

*Primary Examiner*—Cornelius J. Husar
*Assistant Examiner*—Todd G. Williams
*Attorney, Agent, or Firm*—Holman & Stern

[57] ABSTRACT

A connection between a first member (e.g. a piston rod) and a bore in a second member (e.g. a piston) which is formed by two spaced grooves on the first member at least one of which is in register with one of two spaced steps in the bore, and a compression clip mounted in each groove such that when the groove and the step are in register the compression clip is in compression between one face of each groove and one face of the corresponding step and the angle between the compression forces acting on the clip and the longitudinal axis of the bore is in the range 30°–70°.

23 Claims, 10 Drawing Figures

ATTACHING COAXIALLY A MEMBER OR FITTING WITH A BORE THERETHROUGH TO A SHAFT

BACKGROUND OF THE INVENTION

1. Field of the Invention

The present invention relates to a connection between a first member and a bore formed in a second member which is such that said first and second members can be separated relatively easily for maintenance or repair. The connection of the present invention is especially useful for attaching a piston to a piston rod in hydraulic or pneumatic cylinders, and will be described with especial reference to this application, but in fact the present invention is also valuable in any application in which it is necessary to secure a first member in the bore of a second member, especially where very high axial thrusts are present.

2. Description of the Prior Art

Two of the most common methods of securing a piston to a piston rod are shown in FIGS. 1 and 2 of the accompanying drawings.

FIG. 1 shows a longitudinal section through a piston 2 which is secured to a piston rod 3 by a circlip 4. A groove 5 is formed around the circumference of the piston rod 3 with the inner edge of the groove abutting the edge of the piston. The circlip 4 is sprung into the groove 5 and the portion of the circlip which projects out of the groove holds the piston onto the rod. A corresponding circlip is mounted abutting the other end of the piston. In use, the circlip is subjected to forces which are predominantly shearing forces (arrows L) and the strength of the whole piston and piston rod assembly is limited by the strength of the circlip and/or the strength of the groove, in shear. This type of design is disclosed in U.S. Pat. Nos. 4,069,747 and 4,171,665.

FIG. 2 shows a side view of a piston rod 10 which has been machined to provide a reduced diameter portion 11 terminating in a screw-threaded portion 12. The piston (not shown) is mounted on the portion 11 and held in place by a locknut (not shown) screwed onto the portion 12, which forces the piston against shoulder 13.

This design has the following drawbacks:

(a) The strength of the piston rod is reduced by the formation of the reduced-diameter portion 11.

(b) It requires very accurate machining to form the portion 11 exactly concentric with the remainder of the piston rod, and if this is not achieved, the piston will be eccentric in the cylinder resulting in excessive seal and wear-ring wear, and also giving rise to shear forces on the shoulder 13.

(c) The locknut must be very tightly screwed onto the piston, and even so tends to shake loose in time, especially if subjected to frequent shock-loading. The prestress caused by torquing the locknut onto the piston rod reduces the overall strength of the piston and piston rod assembly.

It is also possible to secure the piston to the piston rods by welding (e.g. as disclosed in U.S. Pat. No. 3,312,150) but this has two major drawbacks:

1. To remove the piston from the rod, the weld must be cut away.

2. The heat of welding tends to distort the piston and the rod and/or to damage the material of which they are made.

In addition to the methods described above, a number of more elaborate methods have been proposed:

U.S. Pat. No. 2,853,347 discloses a pump piston which is screw-threaded to a piston rod. A rubber piston body member is secured to the piston head by circlip-type snap rings which lie in grooves formed on the piston head and abut against retainer plates on the body member. This design has the disadvantage that the screw-threaded connection between piston and rod tends to slacken in use, and the circlip connection between the piston body and head has the drawbacks already discussed.

U.S. Pat. No. 3,457,842 discloses a design in which the piston is retained on the piston rod by pairs of collets, one pair at each end of the piston. Part of each collet locates in a groove formed on the piston. This design has the drawback of the FIG. 1 design described above, in that the forces on the collets are predominantly shear stresses, and has the additional drawback that, to secure the piston correctly, the outer surface of the retaining ring of each collet contacts the bore of the cylinder, thus increasing the bore wear rate.

U.S. Pat. No. 3,951,048 discloses a piston secured to a piston rod by circlips recessed into the faces of the piston. This arrangement has the drawbacks of the FIG. 1 design described above.

U.S. Pat. No. 4,317,409 discloses a piston and piston rod for a mud pump, in which the outer edge of each piston is tapered and designed to be expanded outwards towards the cylinder wall by mud pressure, to ensure a good seal between the piston and the cylinder wall. Each tapered portion is supported by a triangular cross-section pressure ring which is held in place by a circular cross section retainer ring which seats in a part-circular groove. The retainer ring does not contact the piston itself, but simply acts as a circlip with respect to the pressure ring. This design is useful only in applications where an extremely abrasive substance is being pumped and unusually heavy piston wear is anticipated, and is of no interest for more general applications.

BRIEF SUMMARY OF THE INVENTION

The present invention provides a connection between a first member and a bore in a second member, the periphery of said first member having a shape similar to that of said bore and said first member being dimensioned so as to be a sliding fit within said bore, characterized in that the connection comprises: two spaced grooves formed around the periphery of the first member; two spaced steps formed around the bore; a compression clip located in and occupying a major portion of the circumferential length of each groove; at least one groove being in register with one of said steps such that the compression clip in said one groove is compressed between one face of said groove and one face of said step and the angle between the compressive forces acting upon said compression clip and the longitudinal axis of the bore is in the range 30°–70°; and the other of said steps being positioned relative to said other groove so as to provide a predetermined amount of binary cushioning in the range from zero to any positive number, between the first member and the second member.

The present invention further provides a connection between a first member and a bore in a second member, the periphery of said first member having a shape similar to that of said bore and said first member being dimensioned so as to be a sliding fit within said bore, said connection comprising: two spaced grooves formed around the periphery of the first member; two steps formed around said bore; a compression clip located in and occupying a major portion of the circumferential length of each groove; each groove being in register with a corresponding one of said steps such that each compression between one face of each groove and one face of the corresponding step, and the angle between the compressive forces acting upon each compression clip and the longitudinal axis of the bore is in the range 30°–70°. Preferably said angle is approximately 45°. Preferably one said step is adjacent each end of the bore.

Preferably also, the compression clip is selected from the following group: a helical segment; a series of helical segments; a circular segment; a series of circular segments; an imperfect circular segment; a series of imperfect circular segments. By 'a series of segments' is meant a plurality of segments aligned or approximately aligned end-to-end so that in combination the segments occupy a major portion of the circumferential length of the groove.

The first and second members may be concentric, but need not be.

BRIEF DESCRIPTION OF THE DRAWINGS

The invention will now be described in detail with reference to the accompanying drawings wherein.

DETAILED DESCRIPTION OF THE PREFERRED EMBODIMENT OF THE INVENTION

By way of example only, a preferred embodiment of the present invention as applied to a hydraulic cylinder is described in detail with reference to FIGS. 3 and 4 of the accompanying drawings.

Figure 3:
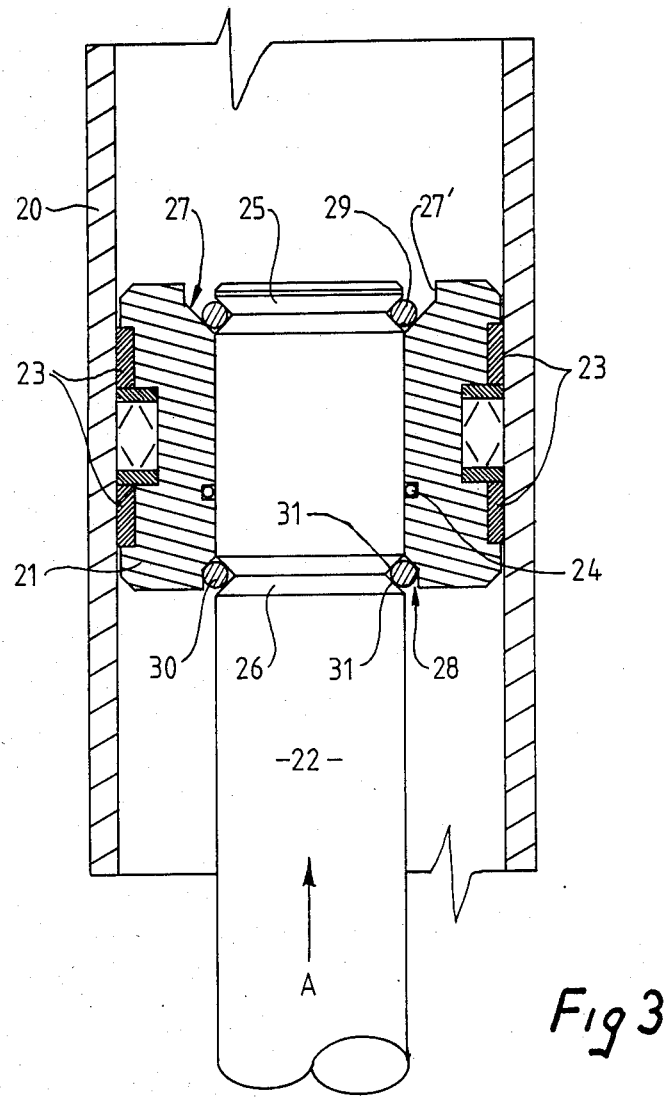
FIG. 3 is a longitudinal cross-sectional view of part of a hydraulic cylinder containing a piston and piston rod in accordance with the present invention, with the cylinder wall and part of the piston cut away.

As shown in FIG. 3, a hydraulic cylinder 20 is fitted with a piston 21 carried on a piston rod 22. The piston 21 is provided with seals and wear rings 23 in known manner, and a further seal 24 is located between the piston rod and the piston, also in known manner.

The portion of the piston rod 22 to which the piston 21 is secured is formed with two spaced parallel circumferential grooves 25, 26. Each groove 25, 26 is represented in the drawings as V-shaped in cross-section, but in fact the root of the 'V' is rounded to minimise the damage to the mechanical properties of the piston rod. The spacing of the grooves 25, 26 is such that one groove lies adjacent each end of the piston 21.

A step 27, 28 is formed in the bore of the piston 21, and the bore is enlarged at 27' adjacent the step 27 for easier access thereto. The steps are spaced apart by a distance approximately equal to the spacing between the grooves 25, 26. The spacing between the steps may be exactly equal to the spacing between the grooves, in which case there is no backlash (binary cushioning) between the piston and the piston rod when assembled (this is essential for some applications) but assembly of the piston onto the rod is more difficult. For most applications, a small degree of backlash (binary cushioning) is acceptable (and indeed often desirable) and in these cases the grooves are spaced about 0.2–0.3 mm further apart than the steps: this permits a degree of axial play, and makes assembly of the piston onto the piston rod very much easier.

A compression clip 29, 30, is located in the aperture formed between the groove 25 and the step 27 and the groove 26 and the step 28 respectively.

Figure 5:
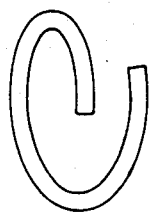
Figure 6:
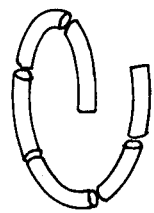
Figure 7:
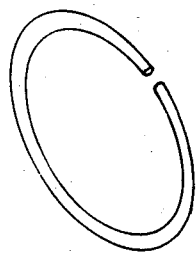
Figure 8:
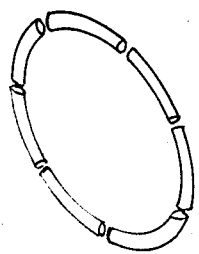
Figure 9:
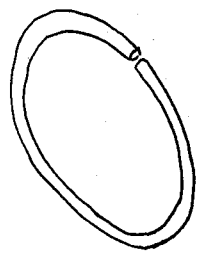
Figure 10:
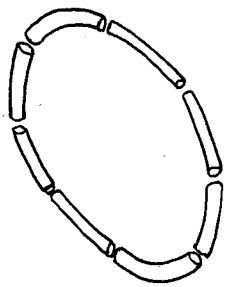

Each compression clip 29, 30 comprises one or more lengths of spring wire in the shape of a segment of a helix (FIG. 5) or a segment of a perfect circle (FIG. 7) or an imperfect circle (FIG. 9). By 'imperfect circle' is meant a shape which, although generally circular, is not in fact a perfect circle. Each compression clip may comprise a single length of wire, with a gap between the ends of the wire to allow the clip to be fitted into the groove as hereinafter described. Alternatively, each compression clip may comprise a series of two or more segments, aligned or approximately aligned end-to-end. FIGS. 6, 8 and 10 illustrate, respectively, compression clips made of a series of helical segments, a series of circular segments, and a series of imperfect circular segments. In either case, the total length of the compression clip is such that it occupies a major portion of the circumferential length of the groove when fitted. It is preferred that the compression clips are made of segments of a helix or of an imperfect circle, because a clip in either of these shapes does not make contact with the groove over the whole of the circumferential length of the clip when it is in a relaxed state (i.e. when the piston is not under load) but instead there is only point contact between the adjacent surfaces of the groove and the clip. Thus, as load is applied to the piston and the clip is pressed more and more tightly into the groove, the clip distorts in stages to take up the shape of the groove, and so provides progressive cushioning as the clip changes shape. When the load is removed, the clip reverts to its original shape. A compression clip formed from one or more helical segments has been found particularly effective in providing progressive snubbing and cushioning of the piston under load. This ability to provide snubbing and cushioning is a considerable practical advantage, because it means that the cylinder components are not subjected to the sudden shock-loading which causes many component failures.

The compression clips are illustrated as circular in cross-section but in fact may be any desired cross-sectional shape. For example, a square cross-section wire wound on edge has been found very suitable. However, for use in hydraulic cylinders, it is advantageous if the clip cross-sectional shape is such that the points of contact 31 between the clip and the groove are below the interface between the piston rod and the piston bore. This is because with prolonged use the clip tends to deform the groove at the points of contact 31, and if these points of contact are on or very close to said interface, the distortion may bind the piston to the piston rod (making removal of the piston difficult) or even distort the piston.

Figure 4:
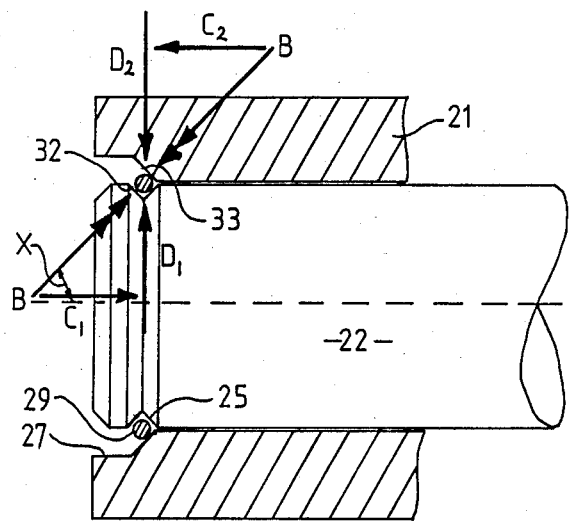
FIG. 4 is a partial cross-sectional view similar to FIG. 3 on an enlarged scale and FIGS. 5, 6, 7, 8, 9 and 10 are perspective views, respectively, of compression clips having the form of a helical segment; series of helical segments; circular segment; series of circular segments; imperfect circular segment; and series of imperfect circular segments.

When the compression clips 29, 30 are located in the grooves 25, 26 as shown in FIGS. 3 and 4 and a load is applied to the piston rod 22 (in the direction of arrow A and in the opposite direction (FIG. 3)) each compression clip is acted on by forces indicated by the double-headed arrows B in FIG. 4. These forces acting on the clip are predominantly compressive forces, i.e. the clip is compressed between the faces 32 and 33 of the groove and step respectively.

The strength of a material under compression is always much greater than the strength of that material in shear, so that the compression clips will accept a very much greater loading in the design of the present invention than would a circlip of comparable dimensions and material.

Arrows $C_1$, $C_2$, $D_1$, $D_2$ represent a resolution of the compressive forces (Arrows B) in two mutually perpendicular directions. The force $C_2$ acting to push the clip out of the groove is counterbalanced by the force $C_1$, and likewise the force $D_1$ which also acts to push the clip out of the groove, is counterbalanced by the force $D_2$. Thus, there is no resultant force tending to dislodge the clip from the groove. It is essential that the compressive forces B are at an angle x to the longitudinal axis of the piston rod 22 in the range 30°-70°, preferably about 45°. This ensures that no component of the forces B will tend to dislodge the clip from the groove.

The opposed faces 32, 33 of the groove and step respectively preferably are mutually parallel, but need not be, providing that the angle of said faces is such that said compressive forces are within the angular range described above. Similarly, the cross-sectional shape of the groove may be varied as desired, providing the shape is such that said compressive forces are within said angular range. However "V" and "U" cross-section grooves are preferred because they meet the above requirements and are easy to form.

The above-described piston and piston rod are assembled by positioning the inner compression clip 30 on the corresponding groove 26, and then sliding the piston 21 over the piston rod 22 until the clip 30 lies within the step 28, as shown in FIG. 3. Alternatively, the piston is slid over the piston rod and then the clip 30 is inserted in the groove 26. If a one-piece compression clip is used, circlip pliers are used to expand the clip to fit it into the groove. If a multi-segment compression clip is used, the segments simply are laid in the groove. For this reason, a multi-segment clip generally is used in the inner groove 26.

The outer compression clip is then fitted into the outer groove 25. The piston is now securely locked onto the rod, but can rotate relative to the rod, thus reducing uneven wear of the cylinder caused by repeated friction on local areas of the cylinder. To dismantle the piston from the piston rod for repair or maintenance, the above sequence is performed in reverse.

The method of the present invention may be modified to provide a cylinder which gives binary cushioning. For this, the grooves formed on the piston are spaced apart by a distance greater than the distance between the corresponding steps in the piston bore. Both grooves are fitted with one-piece compression clips. The piston has a degree of movement allowed along the piston rod (typically 5.00 mm-30 mm, but for some applications greater than 30 mm). At any given position only one of the steps on the piston bore is in engagement with the corresponding groove and compression clip.

A piston and piston rod in accordance with the present invention have the following advantages:

1. Piston and rod are completely concentric, because the piston self-centers as a slide fit over the rod. (assuming of course that the wear ring and seal grooves and piston bore are machined accurately). For this reason, the present invention is particularly useful for the manufacture of through-rod cylinders. It is emphasized that the grooves in the piston rod and the steps in the piston bore need not be machined accurately, i.e. the piston and rod will still be completely concentric even if said grooves and steps are inaccurate and are not themselves concentric, because the piston is centered upon the whole circumference of the piston rod.

2. Compression clips are subjected predominantly to compressive forces, not to shear forces, and can therefore withstand much higher loading than equivalent circlips.

Figure 1:
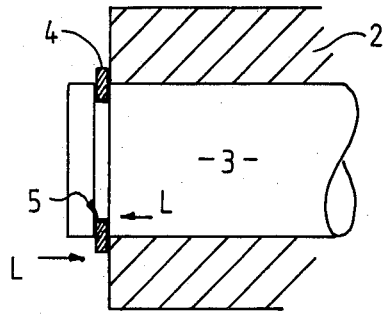
FIG. 1 is a longitudinal cross-sectional view through part of a piston and piston rod in accordance with the prior art.
Figure 2:
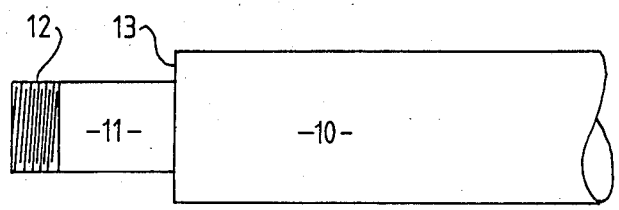
FIG. 2 is a side elevational view of part of a piston rod in accordance with the prior art.

3. Compared to the prior art described with reference to FIG. 2, the piston and piston rod are very much stronger, i.e. there is no major reduction in the external diameter of the rod, only the very small reductions in diameter caused by the grooves, and the piston rod is not pre-stressed by a nut. Also, there is no nut to become unscrewed.

4. Because the piston and rod are totally concentric, there is no side loading of the piston caused by eccentricity of the piston relative to the rod and hence to the cylinder. This means that the rate of wear of the piston seals and wear rings is greatly reduced.

5. The grooves on the piston rod and the steps in the piston bore can be easily and quickly manufactured using known materials and methods. Hence the cost of manufacture is greatly reduced compared to known methods. The prepared parts can be rapidly and simply assembled. Because very little machining has to be done to the piston rods, the machining can be done on hardened and/or chromed material, rather than having to machine the material before hardening and then correct any distortions caused by hardening after machining.

It is emphasized that the method of the present invention is not limited to securing pistons to piston rods. The method of the present invention may be used to secure any one member into a bore in a second member and the first and second members need not be concentric; for example, an eccentric cam could be attached to a shaft using the method of the present invention, or a thrust bearing to a shaft.

I claim:

1. In a connection between a first member and a bore in a second member, wherein the periphery of the first member has a shape similar to that of the bore and the first member is dimensioned to have a sliding fit within the bore, the improvement comprising:

two spaced grooves formed around the periphery of the first member, each groove being defined by at least one face;

two spaced steps formed in said bore, each step being defined by at least one face and being provided by a region of enlarging diameter relative to said bore, said enlarging diameter region extending to the adjacent end of said second member; and a compression clip located in and occupying a major portion of the circumferential length of each groove, said compression clip having a solid cross-section;

each step being located and having a configuration so that at least one groove is in register with one of said steps, said compression clip in said at least one groove is compressed between said at least one face of said at least one groove and said at least one face of said one step and the angle between the compressive forces acting upon said compressed clip and the longitudinal axis of the bore is in the range of 30°–70°, and the other of said steps is positioned relative to said other groove for providing a predetermined amount of binary cushioning in the range from zero to any positive dimension, between the first member and the second member.

2. The connection as claimed in claim 1 wherein said angle between the compressive forces acting on the compression clip and the longitudinal axis of the bore is about 45°.

3. The connection as claimed in claim 1 wherein said compression clip comprising a helical segment.

4. The connection as claimed in claim 1 wherein said compression clip comprises a series of helical segments.

5. The connection as claimed in claim 1 wherein said compression clip comprises a circular segment.

6. The connection as claimed in claim 1 wherein said compression clip comprises a series of circular segments.

7. The connection as claimed in claim 1 wherein said compression clip comprises an imperfect circular segment.

8. The connection as claimed in claim 1 wherein said compression clip comprises an imperfect circular segment.

9. In a connection between a first member and a bore in a second member, wherein the periphery of the first member has a shape similar to that of the bore and the first member is dimensioned to be a sliding fit within the bore, the improvement comprising:

two spaced grooves formed around the periphery of the first member, each groove being defined by at least one face;

two spaced steps formed in said second member, each step being defined by at least one face and being provided by a region of enlarged diameter relative to and joined with said bore said enlarging diameter region extending to the respective end of said second member; and a compression clip having a solid cross-section located in and occupying a major portion of the circumferential length of each groove;

each groove being in register with a corresponding one of said steps so that each compression clip is compressed between said at least one face of each groove and said at least one face of the corresponding step, and the angle between the compressive forces acting upon each compression clip and the longitudinal axis of the bore is in the range of 30°–70°.

10. The connection as claimed in claim 9 wherein one said step is adjacent one end of the bore and the other said step is adjacent the other end of the bore.

11. The connection as claimed in claim 9 wherein said angle between the compressive forces acting on the compression clip and the longitudinal axis of the bore is about 45°.

12. The connection as claimed in claim 9 wherein said bore and the periphery of said first member both are circular.

13. The connection as claimed in claim 12 wherein said first member is concentric with said second member.

14. The connection as claimed in claim 13 wherein said first member is a piston rod and said second member is a piston.

15. The connection as claimed in claim 14 wherein each compression clip engages the corresponding groove at points of contact between the interface of the piston rod and the piston bore and the longitudinal axis of the piston rod.

16. The connection as claimed in claim 9 wherein said compression clip comprises a helical segment.

17. The connection as claimed in claim 9 wherein each groove is V-shaped in cross-section.

18. The connection as claimed in claim 9 wherein said at least one face of each groove and said at least one face of the corresponding step are mutually parallel.

19. The connection as claimed in claim 9 wherein said compression clip comprises a series of helical segments.

20. The connection as claimed in claim 9 wherein said compression clip comprises a circular segment.

21. The connection as claimed in claim 9 wherein said compression clip comprises a series of circular segments.

22. The connection as claimed in claim 9 wherein said compression clip comprises an imperfect circular segment.

23. The connection as claimed in claim 9 wherein said compression clip comprises a series of imperfect circular segments.

* * * * *